(12) United States Patent
Sternfeld (10) Patent No.: US 12,361,122 B2
(45) Date of Patent: Jul. 15, 2025

(54) SYSTEMS AND METHODS FOR RANSOMWARE DETECTION

(71) Applicant: Cybereason Inc., Boston, MA (US)

(72) Inventor: Uri Sternfeld, Tel Aviv (IL)

(73) Assignee: Cybereason Inc.

( * ) Notice: Subject to any disclaimer, the term of this patent is extended or adjusted under 35 U.S.C. 154(b) by 251 days.

(21) Appl. No.: 17/815,101

(22) Filed: Jul. 26, 2022

(65) Prior Publication Data

US 2023/0023584 A1 Jan. 26, 2023

Related U.S. Application Data

(60) Provisional application No. 63/203,505, filed on Jul. 26, 2021.

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01); *G06F 21/568* (2013.01); *G06F 2221/2107* (2013.01)

(58) Field of Classification Search
CPC ..... G06F 21/554; G06F 21/566; G06F 21/568
USPC .......................................................... 726/23
See application file for complete search history.

(56) References Cited

U.S. PATENT DOCUMENTS

| 2019/0121978 A1* | 4/2019 | Kraemer | G06F 21/565 |
| 2021/0152595 A1* | 5/2021 | Hansen | G06F 21/568 |
| 2022/0067159 A1* | 3/2022 | Chen | G06F 21/565 |
| 2022/0164445 A1* | 5/2022 | Poleg | G06F 16/14 |

OTHER PUBLICATIONS

Singh, The consistent rise in ransom demands with encryption speed at 3 seconds, May 22, 2021, linkedin.com, https://www.linkedin.com/pulse/consistent-rise-ransom-demands-encryption-speed-3-seconds-singh?trk=read_related_article-card_title (Year: 2021).*
Crump, How to Stop Ransomware Before the Damage Is Done, May 18, 2017, storageswiss.com, https://storageswiss.com/2017/05/18/stop-ransomware-before-the-damage-is-done/ (Year: 2017).*
Williams, Homograph Attacks using Homoglyphs, Jul. 15, 2020, https://www.blackfog.com/homograph-attacks-using-homoglyphs/ (Year: 2020).*

* cited by examiner

*Primary Examiner* — Zi Ye
(74) *Attorney, Agent, or Firm* — DLA PIPER LLP (US)

(57) ABSTRACT

Systems and methods are provided to detect ransomware and ransomware-like behavior.

24 Claims, 6 Drawing Sheets

SYSTEMS AND METHODS FOR RANSOMWARE DETECTION

CROSS REFERENCE TO RELATED APPLICATIONS

This application claims priority to U.S. Provisional Application No. 63/203,505, filed Jul. 26, 2021, which is herein incorporated by reference in its entirety.

FIELD OF THE INVENTION

Embodiments of the present disclosure relate to cybersecurity and, more particularly, to systems and methods for detecting ransomware.

BACKGROUND OF THE DISCLOSURE

The evolution of ransomware tools and tactics continues to pose significant financial, operational, and reputational risk to even the most vigilant organizations. Ransomware is a type of malware that operates by holding various information ransom. For example, the ransomware may threaten to publish an entity's (e.g., a person or an organization) data or perpetually block access to certain data unless a ransom is paid. Once entering an entity's computer or system, ransomware typically encrypts various files, which renders them inaccessible. The files can then only be decrypted and accessed after some form of payment is made. Because they are relatively inexpensive to undertake and can be highly profitable, the ransomware economy is driving damage costs into the tens of billions of dollars worldwide each year.

SUMMARY OF THE DISCLOSURE

According to one aspect of the present disclosure, a method for detecting ransomware can include monitoring a file system of an endpoint device; detecting a plurality of file events from the file system; generating a plurality of statistical snapshots, the plurality of statistical snapshots comprising two or more statistical snapshots for each of the files from each of the plurality of file events; analyzing the plurality of statistical snapshots to detect one or more file encryptions or the one or more file deletions within the plurality of file events; and analyzing the one or more file encryptions or the one or more file deletions to detect ransomware.

In some embodiments, the method can further include in response to detecting ransomware, performing a remediation action on the endpoint device.in some embodiments, the remediation action can include at least one of notifying an entity associated with the endpoint device; terminating at least one process related to the one or more file encryptions or the one or more file deletions; suspending at least one injected thread related to the one or more file encryptions; quarantining at least one executable file related to the one or more file encryptions or the one or more file deletions; or cleaning up residue associated with the one or more file encryptions or the one or more file deletions. In some embodiments, the residue can include an autorun entry.

In some embodiments, quarantining the at least one executable file can include preventing the files from running again using a pre-execution blocklist of hashes. In some embodiments, the monitoring of the file system is performed using a file-system kernel driver. In some embodiments, detecting the plurality of file events can include detecting events associated with at least one of document files, images, videos, spreadsheets, presentations, password files, source code, databases, keys, or wallets. In some embodiments, plurality of file events can include at least one of an open event, a read event, a MEMMAP event, an overwrite event, a delete event, a truncate event, a create_new event, a rename event, or a close event.

In some embodiments, analyzing the plurality of statistical snapshots to detect one or more file encryptions or the one or more file deletions within the plurality of file events can include computing one or more features for each of the two or more statistical snapshots; comparing the one or more features to calculate an aggregated score for a file event; and in response to calculating the aggregated score for the file event above an encryption threshold, determining that the file event is a file encryption. The one or more statistical features can include at least one of a fuzzy distance, a Shannon entropy, an extension change, an extension/magic mismatch, a header modification, an aggregated printable strings ratio, a longest printable string, a Kullback-Leibler divergence, or a Chi-square test.

In some embodiments, the method can include detecting an open event for a file; determining to continue tracking events for the file based on one or more of an extension of the file and a location of the file; detecting at least one additional event for the file; and generating an after statistical snapshot for the file after detection of the at least one additional event. In some embodiments, detecting the at least one additional event for the file can include detecting the at least one additional event for the file within a pre-defined time window. In some embodiments, the pre-defined time window at about three seconds.

In some embodiments, the method can include tagging the file as modified if the at least one additional event for the file comprises one or more of a write event, an MEMMAP event, or an overwrite event. In some embodiments, the method can include in response to tagging the file as modified, re-reading data of the file; generating the after statistical snapshot for the file; and comparing the after statistical snapshot to any previously generated snapshot for the file. In some embodiments, the method can include tagging the file as deleted if the at least one additional event for the file is equivalent to a delete event or a truncate to zero event. In some embodiments, the method can include, in response to tagging the file as deleted, identifying a pre-created substitute file; generating the after statistical snapshot for the pre-created substitute file; and comparing the after statistical snapshot to any previously generated snapshot for the deleted file.

In some embodiments, the method can include tagging the file as a substitute if the at least one additional event for the file comprises a create_new event. In some embodiments, the method can include, in response to tagging the file as a substitute, identifying an associated pre-deleted file; generating the after statistical snapshot from the substitute file; and comparing the after statistical snapshot to any previously generated snapshot for the pre-deleted file. In some embodiments, analyzing the one or more file encryptions or the one or more file deletions to detect ransomware can include identifying an entity associated with at least one of the one or more file encryptions or the one or more file deletions; incrementing an encryption count associated with the entity; determining a number of file types encrypted by the entity; determining that the encryption count is above a ransomware threshold within a predefined time period; determining that the number is above a file type threshold; and in response to the two determining steps, determining that the entity is exhibiting ransomware-like behavior.

In some embodiments, the predefined time period is about one minute. In some embodiments, the entity can include at least one of a process, a group of processes, or at least one injected thread within a process. In some embodiments, determining that the entity is exhibiting ransomware-like behavior is further based on at least one of a rarity of changed files, a total volume of space occupied by the changed files, or entropy changes across the changed file. In some embodiments, analyzing the one or more file encryptions or the one or more file deletions to detect ransomware can include identifying an entity associated with at least one of the one or more file encryptions or the one or more file deletions; determining that the entity accessed or attempted to access a list of languages on the endpoint device; and in response to the determining step, determining that the entity is exhibiting ransomware-like behavior. In some embodiments, analyzing the one or more file encryptions or the one or more file deletions to detect ransomware can include identifying an entity associated with at least one of the one or more file encryptions or the one or more file deletions; determining that a threshold number of files have been erased from the endpoint device; and in response to the determining step, determining that the entity is exhibiting ransomware-like behavior.

In some embodiments, analyzing the one or more file encryptions or the one or more file deletions to detect ransomware can include applying a machine learning algorithm trained on a set of ransomware samples to identify ransomware-like behavior. In some embodiments, monitoring the file system of the endpoint device can include determining a likelihood that a file will be a target of a ransomware attack. In some embodiments, determining the likelihood can be based on a prevalence of the file or a hash value of the file.

DESCRIPTION

The following detailed description is merely exemplary in nature and is not intended to limit the invention or the applications of its use.

Virtually all existing products that purport to be "anti-ransomware" are either designed to protect against specific families or types of ransomware or to protect files via dedicated backup and recovery solutions. Systems that are designed to protect against specific families require substantial work and effort to research and understand a particular family of ransomware. However, such a technique does not apply to ransomware in general and serves little to no purpose in protecting against new or zero-day ransomwares as they emerge.

Embodiments of the present disclosure relate to systems and methods for detecting ransomware. In particular, the disclosed principles serve to detect ransomware-like behavior in a flexible manner. Contrary to existing solutions, the disclosed embodiments do not rely on ransomware family information in advance of development. Rather, the disclosed principles analyze the behavior of an endpoint (e.g., file events, processes, etc.) in order to detect behavior that is "ransomware-like." Thus, a major technical advantage of the present disclosure is the ability to detect ransomware that is not limited to a specific, known family or type of ransomware. In addition, the systems and methods can be future proofed against new variants of ransomware as they are developed.

The ransomware protection solution of the present disclosure can include three types of detection: 1) detection of file modification (file encryption specifically); 2) detection of the deletion and/or modification of backups; and 3) detection of the modification of critical sections of storage on an endpoint.

The logic behind file-encryption detection is to compare statistical snapshots of a file's "before" and "after" state after it has been modified. Statistical snapshots are summary statistics of a file or part of it. For example, the checksum of a file is a snapshot. The hash value of a file (taken with a known hash function) is a snapshot. The histogram of occurrences of plaintext of given lengths is a statistical snapshot (e.g., there are 100 plaintext strings of length 11 and 103 of length 12 etc.). The snapshot can be of part of the file (e.g., the first 64k bytes) or of the entire file. Any property which is a function of a file and is smaller than the file itself can be a statistical snapshot.

In general, there are several ways to encrypt a file in user-mode. First, the original file object's content is modified or overwritten with encrypted data (i.e., in-place encryption). Second, the original file is deleted and a replacement file is created instead which contains the encrypted data. Third, the location of the file is encrypted. For example, the boot record or the file system can be encrypted.

Figure 1:
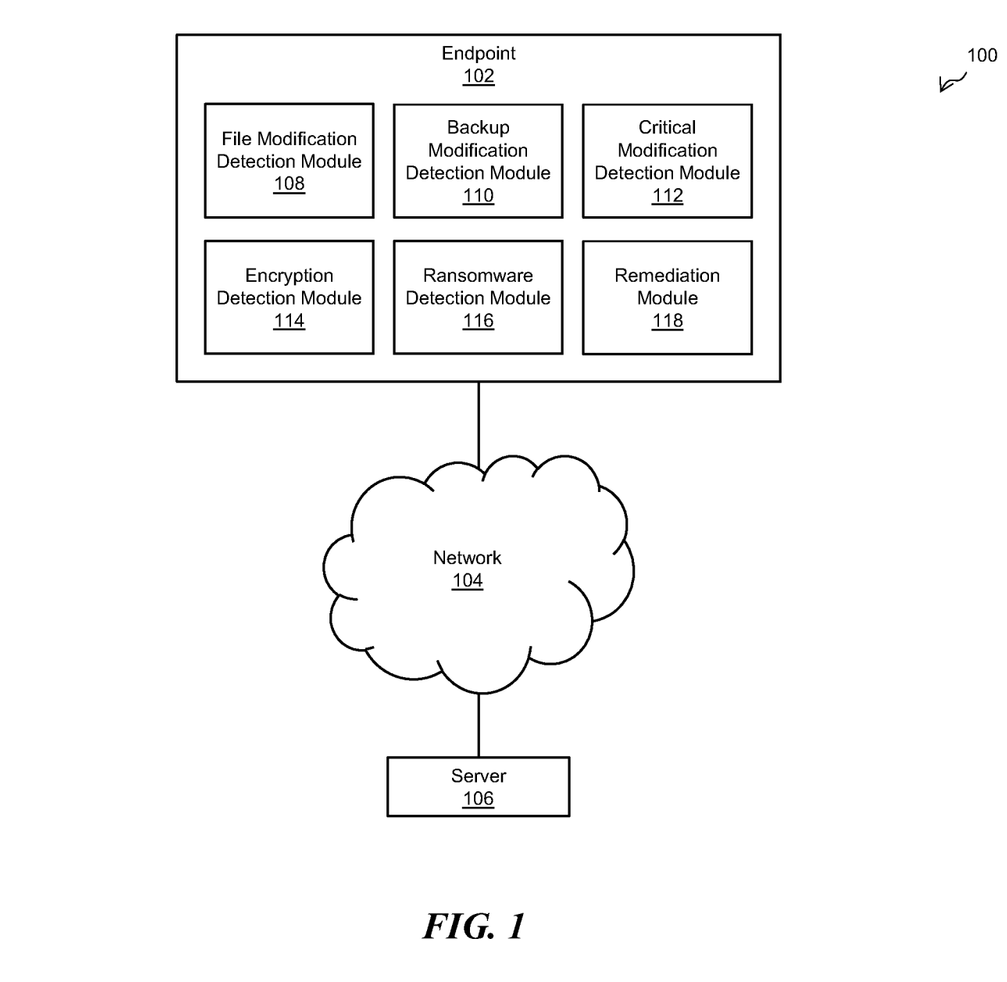
FIG. 1 is a block diagram of an example system for detecting ransomware, according to some embodiments of the present disclosure.

FIG. 1 is a block diagram of an example system 100 for ransomware detection, according to some embodiments of the present disclosure. The system 100 can include an endpoint 102 and a server 106, which are communicably coupled via a network 104. In some embodiments, server 106 is configured to receive various information from endpoint 102, such status reports, detection information, bug reports, etc. In addition, while a single endpoint 102 is shown in system 100, system 100 is not limited to a single endpoint. In many cases, the modules of endpoint 102 may come together as a software package and can operate separately on a large number of endpoint devices.

Endpoint 102 can include one or more computing devices capable of receiving user input, transmitting and/or receiving data via the network 104, and or communicating with the server 106. In some embodiments, endpoint 102 can be representative of a computer system, such as a desktop or laptop computer. Alternatively, endpoint 102 can be a device having computer functionality, such as a personal digital assistant (PDA), a mobile telephone, a smartphone, or other suitable device. In some embodiments, endpoint 102 can be the same as or similar to the device 600 described below with respect to FIG. 6.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

Server device 106 may include any combination of one or more of web servers, mainframe computers, general-purpose computers, personal computers, or other types of computing devices. Server device 106 may represent distributed servers that are remotely located and communicate over a communications network, or over a dedicated network such as a local area network (LAN). Server device 106 may also include one or more back-end servers for carrying out one or more aspects of the present disclosure. In some embodiments, server device 106 may be the same as or similar to server device 500 described below in the context of FIG. 5. In some embodiments, server 106 can include a primary server and multiple nested secondary servers for additional deployments of server 106.

As shown in FIG. 1, endpoint 102 includes various modules, including file modification detection module 108, backup modification detection module 110, critical modification detection module 112, encryption detection module 114, ransomware detection module 116, and remediation module 118. File modification detection module 108 is configured to detection modifications to files, such as by monitoring a file system or directory within endpoint 102, detecting file events, and generating various statistical snapshots of the files involved in file events. Encryption detection module 114 is configured to analyze files and their associated statistical snapshots to determine if a file event involves encryption. Ransomware detection module 116 is configured to analyze data associated with detected file encryptions to detect ransomware-like behavior. For example, the ransomware detection module 116 can analyze the processes or other entities associated with file encryptions to determine if the process's behavior is ransomware-like. Remediation module 118 is configured to perform various remediation actions. For example, remediation module 118 can function as a malware installer; remediation actions can include a detection-only mode (i.e., sending alerts to verified and select devices, including endpoint 102 itself or server 106); terminating processes; and fully removing an entire process tree, executable files, and autorun entries from endpoint 102.

The various system components—such as modules 108-118—may be implemented using hardware and/or software configured to perform and execute the processes, steps, or other functionality described in conjunction therewith.

Figure 2:
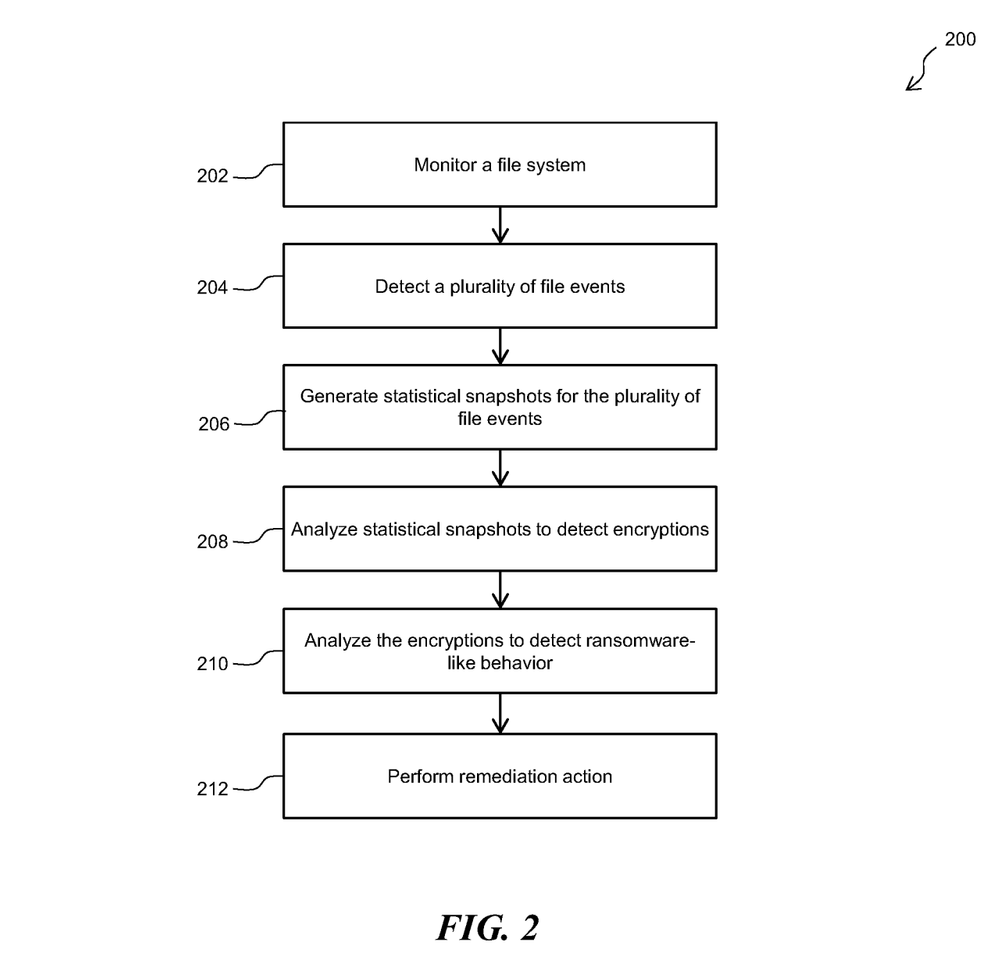
FIG. 2 is an example process for detecting ransomware that can be performed within the system of FIG. 1, according to some embodiments of the present disclosure.

FIG. 2 is an example process 200 for detecting ransomware that can be performed within the system of FIG. 1, according to some embodiments of the present disclosure. In some embodiments, process 200 is performed by the various modules on endpoint 102. At block 202, file modification detection module 108 monitors a file system of endpoint 102. For example, file modification detection module 108 can perform such monitoring via a file-system kernel driver. In other words, the monitoring of the file system can be performed in "kernel mode." In some embodiments, file modification detection module 108 may only monitor a portion of the file system. For example, file modification detection module 108 may monitor a particular set of extensions (i.e., file types) within the file system. The set can be an aggregated list collected from multiple ransomware families, such as document files, images, source code, databases, videos, spreadsheets, presentations, password files, keys, wallets, and other important files of the like. It is important to note that this is not an exhaustive list and that, in many cases, the aggregated list may only need to be of a sufficient breadth in order to suffice. In addition, it is also possible for file modification detection module 108 to maintain a list of files or file types that should not be monitored. For example, because files which belong to the operating system are historically unlikely to be the target of ransomware, these files may not be monitored. In addition, a user may, via endpoint 102, configure the parameters that are monitored by file modification detection module 108. A user may identify specific file types, specific directories (e.g., tracking a directory regardless of file type), and add whitelisted applications. In some embodiments, the likelihood that a given file may be a target of a ransomware attack can be determined by a machine learning algorithm which is applied to a labeled set of ransomware samples. In some embodiments, the prevalence of a file (or a hash value) can be used to determine the likelihood that a file will be targeted.

At block 204, file modification detection module 108, via the kernel driver, detects a plurality of file events from the file system. File events can include open events, read events, MEMMAP events, overwrite events, delete events, truncate events, create_new events, rename events, and close/finish events. After detection of the file events, file modification module 108 sends the file events to a user-mode portion of the module for analysis. At block 206, file modification detection module 108 generates statistical snapshots for each of the plurality of file events detected. For example, file modification detection module 108 may generate a before snapshot and an after snapshot. Additional details with respect to the detection of file events and the generation of statistical snapshots are described in FIG. 3 below.

At block 208, encryption detection module 114 analyzes the statistical snapshots generated at block 206 to detect file encryptions. In particular, encryption detection module 114 analyzes the statistical snapshots for each detected file event in order to determine whether that respective file event involves encryption of a file. Encryption detection module 114 can utilize a variety of techniques (i.e., an assembly of statistical features) to determine whether or not a file has been encrypted. For example, encryption detection module 114 can use one or more (or all) of the below techniques to analyze each statistical snapshot. Then, the results can be compared between the "before" and the "after" statistical snapshot to create an aggregated score. If this score is above a certain pre-defined threshold (referred to herein as an "encryption threshold"), the file is considered encrypted. In some embodiments, only up to a maximum number of bytes (e.g., 64 KB) is read from the beginning of the file and used for calculations, while the rest of the file is ignored. In some embodiments, a sampling of bytes can be taken from other locations in the file, in which case the location may be predetermined or randomly determined. This can be performed to speed-up calculations and to improve encryption detection when comparing smaller, similar-sized chunks. While some ransomware families intentionally skip the beginning of files when encrypting them, they typically only skip up to the first approximately 2 KB of the file. In addition, files which are too small to yield any significant statistical indicators can be ignored.

When analyzing the statistical snapshots, encryption detection module 114 may utilize one or more of the following features: fuzzy distances, Shannon entropy spikes, extension changes, extension/magic mismatches, header modifications, aggregated printable strings ratio drops, longest printable string drops, Kullback-Leibler divergence spikes, and Chi-square tests.

For fuzzy distances, encryption detection module 114 can calculate the fuzzy distance between the before and after snapshots, such as by using a locality-sensitive ("fuzzy") hash. If there is a substantial enough difference between the snapshots, then the file may be considered encrypted. However, in general, unless the before and after snapshots are at least somewhat different, the file is not considered encrypted regardless of other features. In other words, if the fuzzy distance is very small, the file will not be considered encrypted. In some embodiments, the fuzzy distance can be calculated using the techniques described in U.S. Provisional Patent Application No. 63/054,138, titled "BOSS," which is herein incorporated by reference in its entirety.

For Shannon entropy spikes, encryption detection module 114 can calculate the Shannon entropy for each snapshot (i.e., for each of the before and after snapshots). If the calculated entropy of the after snapshot is higher than a pre-determined threshold (referred to herein as an upper entropy threshold) and the entropy of the before snapshot is lower than another pre-determined threshold (referred to herein as a lower entropy threshold), then the file can be considered encrypted. Additionally or alternatively, other methods of comparing the entropy levels can be utilized, such as a ratio, a difference, etc. In addition, the entropy thresholds can be dependent on the file type; this can allow for consideration of the divergence of entropy levels from standard entropy levels of similar files.

For extension changes, these can generally be considered a factor indicative of file encryption. Files usually do not change their extension after their creation, as it often hinders their usability. Furthermore, an extra penalty can be applied if the new extension type is unknown or appears random.

For extension/magic mismatches, a list of known "magic" values can be compared to the extension, enabling the detection of mismatches. Many file formats use a magic value (which is defined as a constant numerical or text value used to identify a file format or protocol), a well-known value that typically appears at the beginning of the file, or very close to the beginning. These comparisons can be especially effective against ransomware, as ransomware typically does not modify the original extension while encrypting the header. Ransomware that do skip the header and modify the extension typically are harder to detect.

For header modification, it is possible to estimate the modification of the header of a file by performing Levenshtein-distance (i.e., edit distance) calculations on a fixed-size chunk from the beginning of the file. Advantages of this method are that it does not depend on any file-type-specific indicators and does not require parsing.

For aggregated printable strings ratio drops, the lengths of all printable strings in the data can be summed and divided by the total size. Based on this calculation, significant drops in printable strength lengths can be detected. A printable string is defined as a sequence of consecutive printable characters of a fixed length. In some embodiments, the length can be eight characters. In some embodiments, at least one of ASCII (American Standard Code for Information Interchange) and wide-char strings can be considered.

For longest printable string drops, the length of the longest printable string of each of the before and after snapshots can be compared to detect drops. Often, high entropy files (e.g., PDFs) can still contain multiple printable strings, while encrypted files seldom do. In some embodiments, a histogram of printable string number can be analyzed as a function of length. Various methods of comparing histograms can be utilized, such as those described in "Expanding Histogram of Colors with Gridding to Improve Tracking Accuracy" by K. Meshgi and S. Ishi et al. (2015), which is herein incorporated by reference in its entirety.

For Kullback-Leibler divergence spikes and Chi-square tests, sharp increases in divergence in the before and/or after snapshots relative to standard entropy levels can suggest file encryption.

At block 210, ransomware detection module 116 analyzes the detected file encryptions to detect ransomware-like behavior. This can involve determining that a specific process is responsible for a certain number of file encryptions within a specified time period. In some embodiments, suspicious activity on a single file can suffice to detect ransomware behavior while, in other embodiments, the probability that ransomware is active in the system across multiple files can be aggregated. Additional details on the detection of ransomware-like behavior are discussed in relation to FIG. 4. In some embodiments, a machine learning algorithm can be applied to a labeled set of ransomware samples to define a set of ransomware-like behavior. Examples of machine learning algorithms can include deep learning, feature extraction, a hidden Markov model (HMM), linear regression, etc.

At block 212, remediation module 118 performs a remediation action. In general, the idea behind ransomware detection is to identify and undo any changes the ransomware may have made to the endpoint 102. This may be limited to the encrypting entity, or it may encompass any other processes which are determined to be a part of the ransomware attack. In some embodiments, remediation module 118 may decide to ignore detections if they are determined to be benign, critical (e.g., operating system processes), or allowed (e.g., whitelisted, signed executables, etc.). In some embodiments, a remediation action can include a simple notification to the endpoint 102 or an associated server or other device. In some embodiments, the remediation action may include terminating relevant processes, suspending injected threads, quarantining executable files to prevent them from being used, and cleaning up any residue, such as autorun entries, ransom notes, etc. In some embodiments, quarantining executable files can include preventing the files from running again using a pre-execution blocklist of hashes.

In some embodiments, upon detection of ransomware-like behavior, remediation module 118 gathers a group of potential targets that will undergo the remediation actions. To find the "root cause" process, remediation module 118 can climb the process hierarchy (e.g., follow a child process to its parent) until the first protected or non-recent root is reached. Protected processes can either be explicitly whitelisted, known critical process, operating system processes, and/or digitally signed executables. In addition, to protected and non-protected processes, there can be an intermediary type of process: "host processes." These are benign processes which are nonetheless often used to execute malicious code. These can include, for example, scripting engines (e.g., PowerShell™, CScript), loaders (msiexec, rundll32), shell (cmd), and other container processes. When these are encountered, remediation module 118 can treat these like non-protected processes but may not quarantine their executables.

In some embodiments, the target of any remediation actions can include the detected process itself or, if the process itself is important (e.g., an injected thread), a thread or group of threads inside the process. In some embodiments, the target of the remediation actions can be the detected process and at least a portion of its child-process tree. In some embodiments, the target of the remediation actions can be the root cause process (which may be the detected process itself or one of its ancestor processes) and at least a portion of its child processes, including the detected process.

Figure 3:
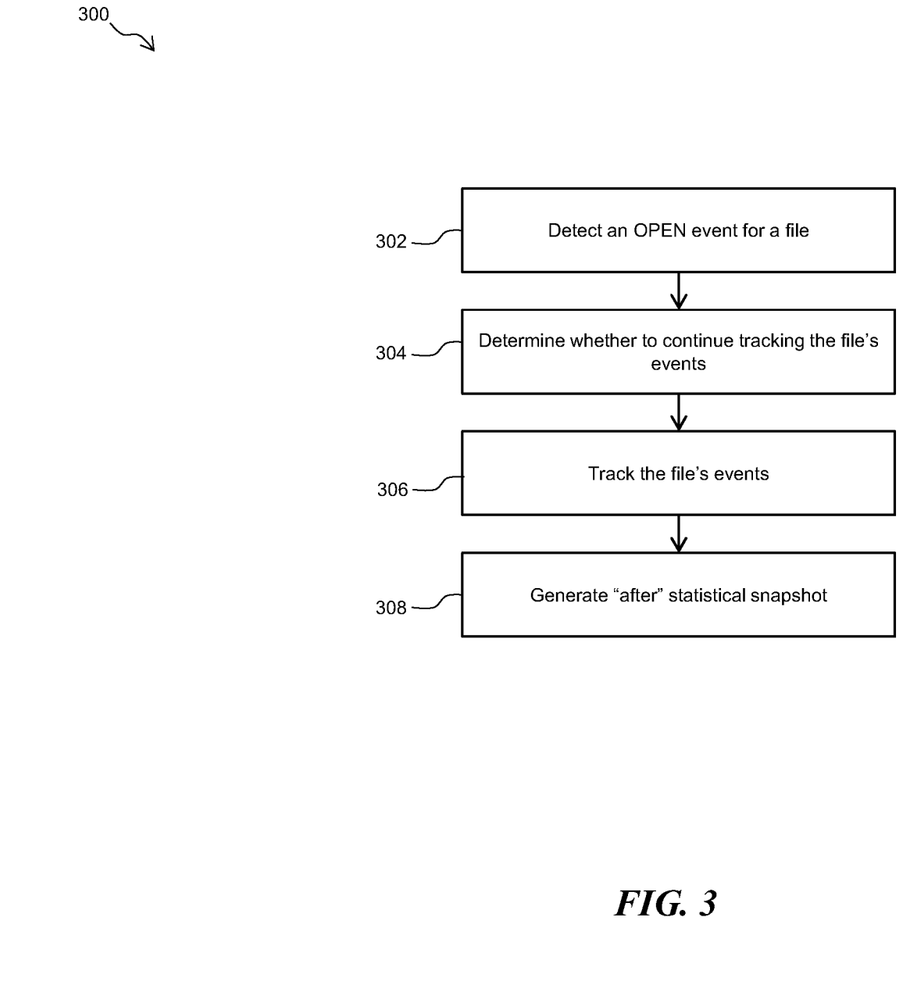
FIG. 3 is an example process for generating and analyzing statistical snapshots, according to some embodiments of the present disclosure.

FIG. 3 is an example process 300 for generating and analyzing statistical snapshots, according to some embodiments of the present disclosure. Process 300 may be performed by the file modification detection module 108 at blocks 204 and 206 of process 200. At block 302, file modification detection module 108 detects an open event for a file, as any file operation first creates a file handle by opening it. At block 304, file modification detection module 108 determines whether to continue tracking the file's events after it is opened. This decision can be performed based on the file's type (e.g., by extension), by the file's location, or by a combination of both. It is important to note that, when a file is renamed, the original filename can be remembered and future decisions can be made based on it, rather than just on the current name. In the case that file modification detection module 108 determines that it will continue tracking a file's events, the file-system kernel driver will continue sending events for the file until it is closed or for a certain time window. In some embodiments, the time window may begin immediately upon deciding to track the file's events. In some embodiments, the time window may begin sometime thereafter either after a fixed amount of time or after a random amount of time with a predetermined distribution, in an attempt to detect delayed-execution-type ransomware.

At block 306, file modification detection module 108 tracks the file's events and, at block 308, file modification detection module 108 generates "after" statistical snapshots. In some embodiments, file modification detection module 108 may only track events for the file for a predefined time window, which can be on the order of a few seconds. In some embodiments, the time window can be greater than one millisecond or some other small number. The logic behind this length of time window is that ransomware tends to encrypt multiple files quickly. In addition, a large proportion of ransomware families require only a very short period of time to encrypt a single file, so in order to reduce the error, only the most recent activities may be considered. However, a time window of few seconds is not limiting and is merely exemplary in nature. As discussed above in relation to block 204, file modification detection module 108 can detect file events which can include read events, MEMMAP events, overwrite events, delete events, truncate events, create_new events, rename events, and close/finish events.

In the case of read events, when a tracked file is read for the first time within the time window, a statistical snapshot is calculated and stored. In some embodiments, the original file's data may not be stored, and the statistical snapshots can be automatically discarded if the file was not modified soon thereafter. In some embodiments, the snapshot is calculated when a predetermined part of the file is ready. In some embodiments, the predetermined part of the file can be the start of the file.

In the case of write events, when a tracked file is written to, file modification detection module 108 tags the file as modified.

In the case of a tracked file being mapped with writing permission (i.e., MEMMAP event), file modification detection module 108 considers the event to be both a read event and write event. Therefore, if there is no statistical snapshot generated during the time window, the snapshot is then calculated and stored. In addition, file modification detection module 108 tags the file as modified.

In the case of file modification detection module 108 detecting an overwrite event, the file is tagged as modified.

In the case of a delete event, when a tracked file is deleted or opened for deletion, file modification detection module 108 tags the file as deleted. Typically, when original tracked files are deleted and replaced by a new file containing the encrypted data (i.e., as a result of ransomware), the switch can occur in two ways: either the original is deleted and then a replace is created, or vice versa. Therefore, file modification detection module 108 can check if there's a "pre-created" replace file or remember the filename in case there is a "post-created" replacement file later on. Substitute file names can be matched to the original filenames they replace using similarity in location, size, and name. The time of deletion and writing can also be used. In addition, the use of bounds on the compression ratios could be used, as can the total number of created files vs. deleted files within the monitored file system.

Some ransomware use "truncate to zero" instead of delete. Therefore, file modification detection module 108 treats truncate events the same as delete events (i.e., marking the file as deleted).

When new files are created (i.e., create_new events), file modification detection module 108 can check if there is a "pre-deleted" tracked file for which this is a replacement and/or remember the filename in case there is a "post-deleted" tracked file later on in analysis. If this file is a replacement for a pre-deleted tracked file, file modification detection module 108 tags it as a substitute. File modification detection module 108 matches substitute filenames to original filenames e.g., using similarity in location, name, and size. It is also possible to match filenames in a graph where we match sets of files e.g., using a flow algorithm (examples of such algorithms can be found at Metrics for graph comparison: A Practitioner's Guide by Peter Wills, Francois G. Meyer et al. (Feb. 12, 2020) which is incorporated by reference.

In addition, ransomware often rename files at various points during the encryption process. Therefore, file modification detection module 108 tracks the original filename for tracked files, allowing for continued tracking of the file when they are re-opened shortly after the rename event, even if the extension and/or location is now different. In addition, it is also possible that ransomware can overwrite files using rename by setting the new filename to an existing one and using the appropriate flag. File modification detection module 108 treats such cases like overwrite events.

Any opened file handle will typically be closed. Therefore, analysis and comparisons by file modification detection module 108 can be deferred until a close event is sent, which also indicates that there will be no more events for this handle unless the file is re-opened. Potential cases include the following: (1) if the file that's closing was tagged as modified, file modification detection module 108 re-reads the file's data, calculates the after statistical snapshot, and compares it to any stored before snapshot for the same original filename; (2) if the file that's closing was tagged as deleted and there is a pre-created substitute file, file modification detection module 108 calculates an after statistical snapshot from the substitute file and compares it to any stored before snapshot of the deleted original filename; and (3) if the file that's closing was tagged as substitute and there's a pre-deleted tracked file, file modification detection module 108 calculates an after statistical snapshot from the substitute file and compares it to any stored before snapshot of the deleted original filename. In a special case of (2), if the pre-created substitute file is a valid archive of a known format, file modification detection module 108 may not perform a comparison to remove the possibility of false positives. In some embodiments, the comparison may not be performed immediately after a close event; rather, the comparison may be performed after a certain amount of time has elapsed, after enough other files have been opened, or any other triggers.

Figure 4:
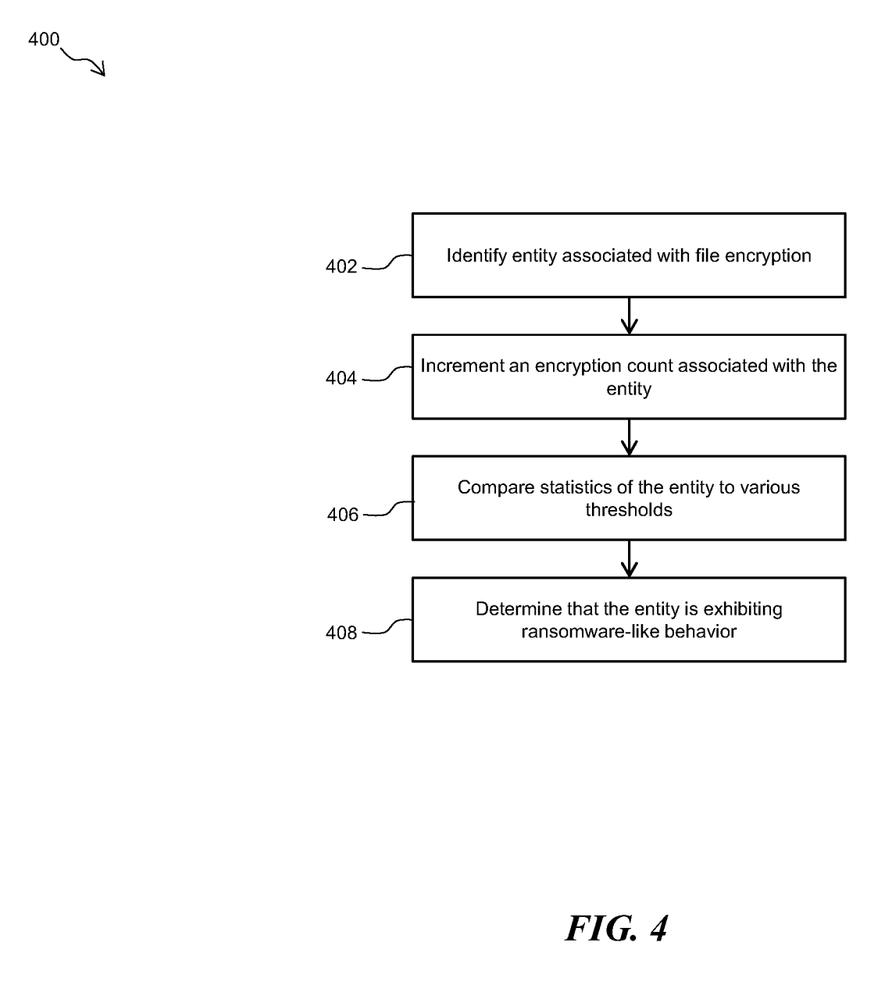
FIG. 4 is an example process for detecting ransomware-like behavior, according to some embodiments of the present disclosure.

FIG. 4 is an example process 400 for detecting ransomware-like behavior, according to some embodiments of the present disclosure. Process 400 may be performed by ransomware detection module 116 at block 210 of process 200. At block 402, ransomware detection module 116, once a file is detected as being encrypted, identifies an entity associated with the file encryption. The entity may be a single process, multiple processes, or individual injected threads within a process. At block 404, ransomware detection module 116 increments an encryption count associated with the entity (i.e., a number of encrypted files associated with the entity). At block 406, ransomware detection module 116 compares statistics of the entity to various thresholds. For example, if, at any point, an entity has encrypted a number of files above a certain threshold (referred to herein as a ransomware threshold) within a predefined time period (e.g., one minute), and the number of different file types encrypted is also above a second threshold (referred to herein as a file type threshold), then, at block 408, ransomware detection module 116 determines that the entity is exhibiting ransomware-like behavior. In some embodiments, ransomware detection module 116 can consider various factors when determining whether an entity is determining ransomware-like behavior, such as the rarity of files that have been changed, whether the files which have been changed are changed often or not, whether the total volume of space occupied by files which have been changed is large, whether the total changes (e.g., as measured by entropy) across the changed files is large, etc.

In addition, other meta-statistical features may be considered. For example, ransomware detection module 116 may identify spikes in file renames to unknown extensions as well as large read/write/delete operations as being considered ransomware-like behavior. Once an entity is determined to be exhibiting ransomware-like behavior, ransomware detection module 116 passes the identifying information to the remediation module 118 for further handling.

Other features may also be considered. For example, if the program accesses the list of languages installed on the computer, this might result in increased suspicion and a decrease in the threshold which files are allowed to be encrypted. In particular, if the speed of encryption changes when the Cyrillic character set is installed, this can be seen as suspicious.

In some embodiments, the list of languages presented to a program can be modified to as to include different language sets.

In some embodiments, the set of languages presented can vary where different languages are sometimes presented.

In some embodiments various metrics of the program can be compared when different language sets are presented. The metrics include CPU use, encryption amount, GPU usage, memory usage, amount of reads, amount of writes, etc. Other metrics are also possible.

Embodiments of the present disclosure also relate to systems and methods for detecting the deletion and/or modification of backups. Modification or deletion of backups is another typical technique employed by many ransomware families. A common backup framework uses a Volume Shadow-Copy Service (VSS), which is used by the operating system of a device (e.g., endpoint 102) for backups and so deletion of the VSS can be considered suspicious. The VSS is a built-in mechanism in modern Windows versions that allows for automatic backups of important files. Therefore, it can often be a prime target for many ransomware families which attempt to completely delete it prior to (and sometimes after) the encryption. Full deletion of the entire VSS for legitimate purposes is quite rare.

One such way of detecting VSS (or similar) deletion is by using regular expressions over command lines of any created process. Ransomware families typically use only a few (around five) command lines to achieve VSS deletion. By detecting such command lines, it can be possible to detect and stop ransomware before they start running. In addition, false positives with such a technique can be negligible. Such detection can be performed by backup modification detection module 110. In addition, backup modification detection module 110 can, via hooking the service itself, detect attempts to programmatically delete the VSS.

In some embodiments, the disclosed principles relate the to detection of erased files. While the signal is stronger if files are both created and destroyed, it can be suspicious if a sufficient number of files are destroyed. An example can be if an adversary is attempting to wipe a disk.

Embodiments of the present disclosure also relate to systems and methods for detecting the modification of critical sections of the storage of an endpoint, such as endpoint 102. In some embodiments, this can involve overwrites to the Master Boot Record (MBR) or the Unified Extensible Firmware Interface (UEFI), as some ransomware are essentially bootkits. That is, instead of encrypting files in user-mode using the operating system API, they instead overwrite the MBR and induce a restart, which allows them to hijack the boot sequence and encrypt attached drive before the operating system starts. It should be noted that most ransomware are not bootkits, and most bootkits are not ransomware, so this method of detection provides protection from malware other than just ransomware. By using a dedicated kernel driver, critical modification detection module 112 can identify any write attempts to the MBR, which is defined as the first sector (512 bytes) of the first physical drive. In such cases, a message is sent to the user-mode engine with the data "before" and "after." Since the MBR's content is very infrequently modified, and in such cases of modification the result is still very similar to the previous version, it's possible to detect and prevent such overwrites using a fuzzy hash. It is important to note that legitimate overwrites of the MBR are possible but can be rare and are usually planned long in advance. As an example, most disk-encryption utilities need to start before the operating systems, and therefore modify the MBR. In such cases, this protection method can simply be disabled before the legitimate modification and re-enabled afterwards.

Figure 5:
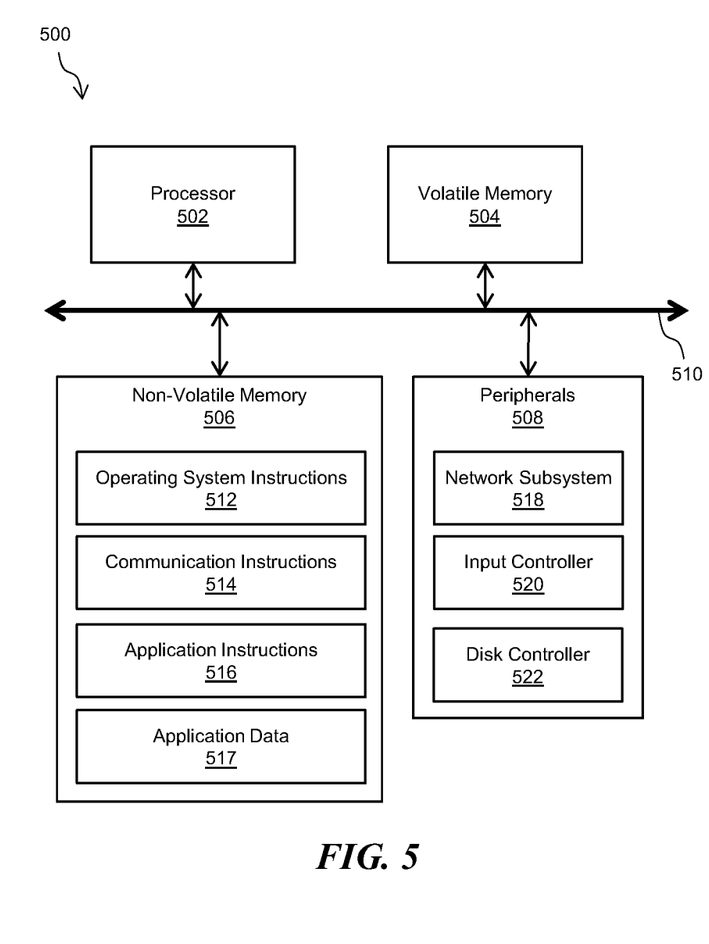
FIG. 5 is an example server device that can be used within the system of FIG. 1 according to an embodiment of the present disclosure.

FIG. 5 is a diagram of an example server device 500 that can be used within system 100 of FIG. 1. Server device 500 can implement various features and processes as described herein. Server device 500 can be implemented on any electronic device that runs software applications derived from complied instructions, including without limitation personal computers, servers, smart phones, media players, electronic tablets, game consoles, email devices, etc. In some implementations, server device 500 can include one or more processors 502, volatile memory 504, non-volatile memory 506, and one or more peripherals 508. These components can be interconnected by one or more computer buses 510.

Processor(s) 502 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 510 can be any known internal or external bus technology, including but not limited to ISA, EISA, PCI, PCI Express, USB, Serial ATA, or FireWire. Volatile memory 504 can include, for example, SDRAM. Processor 502 can receive instructions and data from a read-only memory or a random access memory or both. Essential elements of a computer can include a processor for executing instructions and one or more memories for storing instructions and data.

Non-volatile memory 506 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 can store various computer instructions including operating system instructions 512, communication instructions 514, application instructions 516, and application data 517. Operating system instructions 512 can include instructions for implementing an operating system (e.g., Mac OS®, Windows®, or Linux). The operating system can be multi-user, multiprocessing, multitasking, multithreading, real-time, and the like. Communication instructions 514 can include network communications instructions, for example, software for implementing communication protocols, such as TCP/IP, HTTP, Ethernet, telephony, etc. Application instructions 516 can include instructions for various applications. Application data 517 can include data corresponding to the applications.

Peripherals 508 can be included within server device 500 or operatively coupled to communicate with server device 500. Peripherals 508 can include, for example, network subsystem 518, input controller 520, and disk controller 522. Network subsystem 518 can include, for example, an Ethernet of WiFi adapter. Input controller 520 can be any known input device technology, including but not limited to a keyboard (including a virtual keyboard), mouse, track ball, and touch-sensitive pad or display. Disk controller 522 can include one or more mass storage devices for storing data files; such devices include magnetic disks, such as internal hard disks and removable disks; magneto-optical disks; and optical disks.

Figure 6:
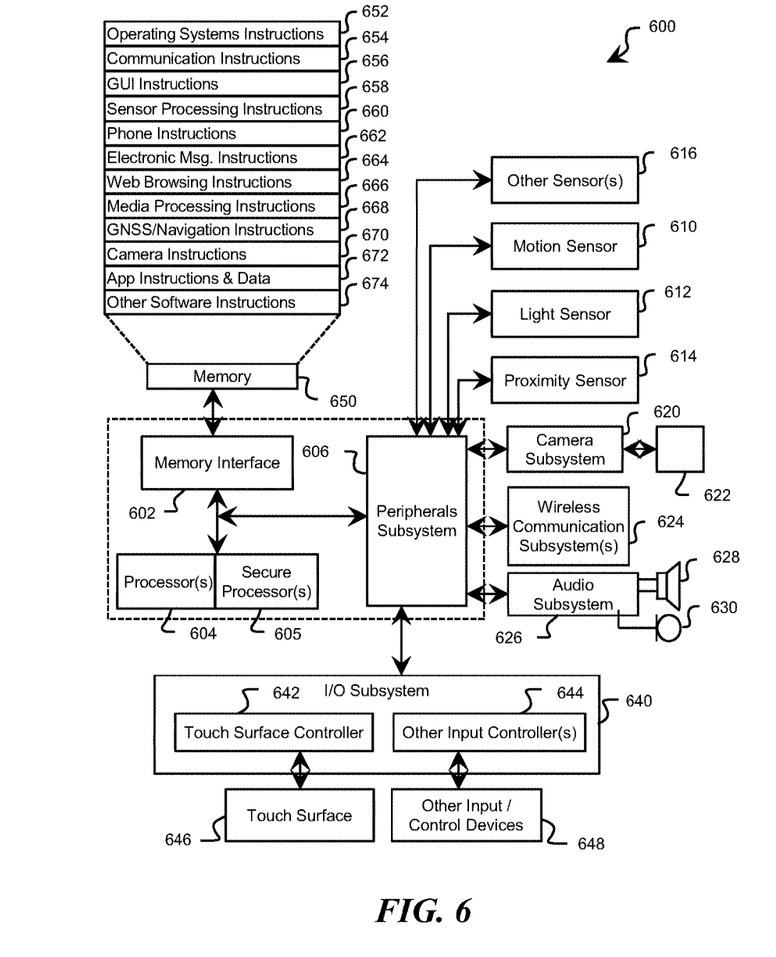
FIG. 6 is an example computing device that can be used within the system of FIG. 1 according to an embodiment of the present disclosure.

FIG. 6 is an example computing device that can be used within the system 100 of FIG. 1, according to an embodiment of the present disclosure. In some embodiments, device 600 can be endpoint 102. The illustrative user device 600 can include a memory interface 602, one or more data processors, image processors, central processing units 604, and/or secure processing units 605, and peripherals subsystem 606. Memory interface 602, one or more central processing units 604 and/or secure processing units 605, and/or peripherals subsystem 606 can be separate components or can be integrated in one or more integrated circuits. The various components in user device 600 can be coupled by one or more communication buses or signal lines.

Sensors, devices, and subsystems can be coupled to peripherals subsystem 606 to facilitate multiple functionalities. For example, motion sensor 610, light sensor 612, and proximity sensor 614 can be coupled to peripherals subsystem 606 to facilitate orientation, lighting, and proximity functions. Other sensors 616 can also be connected to peripherals subsystem 606, such as a global navigation satellite system (GNSS) (e.g., GPS receiver), a temperature sensor, a biometric sensor, magnetometer, or other sensing device, to facilitate related functionalities.

Camera subsystem 620 and optical sensor 622, e.g., a charged coupled device (CCD) or a complementary metal-oxide semiconductor (CMOS) optical sensor, can be utilized to facilitate camera functions, such as recording photographs and video clips. Camera subsystem 620 and optical sensor 622 can be used to collect images of a user to be used during authentication of a user, e.g., by performing facial recognition analysis.

Communication functions can be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 624. The specific design and implementation of communication subsystems 624 can depend on the communication network(s) over which the user device 600 is intended to operate. For example, user device 600 can include communication subsystems 624 designed to operate over a GSM network, a GPRS network, an EDGE network, a WiFi or WiMax network, and a Bluetooth™ network. For example, wireless communication subsystems 624 can include hosting protocols such that device 600 can be configured as a base station for other wireless devices and/or to provide a WiFi service.

Audio subsystem 626 can be coupled to speaker 628 and microphone 630 to facilitate voice-enabled functions, such as speaker recognition, voice replication, digital recording, and telephony functions. Audio subsystem 626 can be configured to facilitate processing voice commands, voiceprinting, and voice authentication, for example.

I/O subsystem 640 can include a touch-surface controller 642 and/or other input controller(s) 644. Touch-surface controller 642 can be coupled to a touch-surface 646. Touch-surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In some implementations, a pressing of the button for a first duration can disengage a lock of touch-surface 646; and a pressing of the button for a second duration that is longer than the first duration can turn power to user device 600 on or off. Pressing the button for a third duration can activate a voice control, or voice command, module that enables the user to speak commands into microphone 630 to cause the device to execute the spoken command. The user can customize a functionality of one or more of the buttons.

Touch-surface 646 can, for example, also be used to implement virtual or soft buttons and/or a keyboard.

In some implementations, user device 600 can present recorded audio and/or video files, such as MP3, AAC, and MPEG files. In some implementations, user device 600 can include the functionality of an MP3 player, such as an iPod™. User device 600 can, therefore, include a 36-pin connector and/or 8-pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store an operating system 652, such as Darwin, RTXC, LINUX, UNIX, OS X, Windows, or an embedded operating system such as VxWorks.

Operating system 652 can include instructions for handling basic system services and for performing hardware dependent tasks. In some implementations, operating system 652 can be a kernel (e.g., UNIX kernel). In some implementations, operating system 652 can include instructions for performing voice authentication.

Memory 650 can also store communication instructions 654 to facilitate communicating with one or more additional devices, one or more computers and/or one or more servers. Memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic messaging-related process and functions; web browsing instructions 664 to facilitate web browsing-related processes and functions; media processing instructions 666 to facilitate media processing-related functions and processes; GNSS/Navigation instructions 668 to facilitate GNSS and navigation-related processes and instructions; and/or camera instructions 670 to facilitate camera-related processes and functions.

Memory 650 can store application (or "app") instructions and data 672, such as instructions for the apps described above in the context of FIGS. 2-4 and for modules 108-118. Memory 650 can also store other software instructions 674 for various other software applications in place on device 600.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for detecting ransomware comprising:
   monitoring a file system of an endpoint device;
   detecting a plurality of file events from the file system;
   generating a plurality of statistical snapshots, the plurality of statistical snapshots comprising two or more statistical snapshots for each of the files from each of the plurality of file events, wherein generating a statistical snapshot for each of the files comprises:
      detecting an open event for the associated file;
      determining to continue tracking events for the associated file based on one or more of an extension of the associated file and a location of the associated file;
      monitoring the associated file for a pre-defined window of time after the open event;
      detecting at least one additional event for the associated file in the pre-defined window; and
      generating an after statistical snapshot for the associated file after detection of the at least one additional event;
   analyzing the plurality of statistical snapshots to detect one or more file encryptions or one or more file deletions within the plurality of file events; and
   analyzing the one or more file encryptions to detect ransomware, wherein analyzing the one or more file encryptions to detect ransomware comprises:
      identifying an entity associated with at least one of the one or more file encryptions;
      incrementing an encryption count associated with the entity reflecting a number of encrypted filed associated with the entity;
      determining a number of file types encrypted by the entity;
      determining that the encryption count is above a ransomware threshold within a predefined time period;
      determining that the number is above a file type threshold; and
      in response to determining that the number is above the file type threshold and determining that the encryption count is above the ransomware threshold within the predefined time period, determining that the entity is exhibiting ransomware-like behavior.

2. The method of claim 1 further comprising, in response to detecting ransomware, performing a remediation action on the endpoint device.

3. The method of claim 2, wherein the remediation action comprises at least one of:
   notifying an entity associated with the endpoint device;
   terminating at least one process related to the one or more file encryptions;
   suspending at least one injected thread related to the one or more file encryptions;
   quarantining at least one executable file related to the one or more file encryptions; or
   cleaning up residue associated with the one or more file encryptions.

4. The method of claim 3, wherein the residue comprises an autorun entry.

5. The method of claim 3, wherein quarantining the at least one executable file comprises preventing the files from running again using a pre-execution blocklist of hashes.

6. The method of claim 1, wherein the monitoring of the file system is performed using a file-system kernel driver.

7. The method of claim 1, wherein detecting the plurality of file events comprises detecting events associated with at least one of document files, images, videos, spreadsheets, presentations, password files, source code, databases, keys, or wallets.

8. The method of claim 1, wherein the plurality of file events comprises at least one of an open event, a read event, a MEMMAP event, an overwrite event, a delete event, a truncate event, a create_new event, a rename event, or a close event.

9. The method of claim 1, wherein analyzing the plurality of statistical snapshots to detect one or more file encryptions within the plurality of file events comprises;
   computing one or more features for each of the two or more statistical snapshots;
   comparing the one or more features to calculate an aggregated score for a file event; and
   in response to calculating the aggregated score for the file event above an encryption threshold, determining that the file event is a file encryption;
   wherein the one or more statistical features comprise at least one of a fuzzy distance, a Shannon entropy, an extension change, an extension/magic mismatch, a header modification, an aggregated printable strings ratio, a longest printable string, a Kullback-Leibler divergence, or a Chi-square test.

10. The method of claim 1 comprising tagging the file as modified if the at least one additional event for the file comprises one or more of a write event, an MEMMAP event, or an overwrite event.

11. The method of claim 10 comprising, in response to tagging the file as modified:
    re-reading data of the file;
    generating the after statistical snapshot for the file; and
    comparing the after statistical snapshot to any previously generated snapshot for the file.

12. The method of claim 1 comprising tagging the file as deleted if the at least one additional event for the file is equivalent to a delete event or a truncate to zero event.

13. The method of claim 12 comprising, in response to tagging the file as deleted:
    identifying a pre-created substitute file;
    generating the after statistical snapshot for the pre-created substitute file; and
    comparing the after statistical snapshot to any previously generated snapshot for the deleted file.

14. The method of claim 1 comprising tagging the file as a substitute if the at least one additional event for the file comprises a create_new event.

15. The method of claim 14 comprising, in response to tagging the file as a substitute:
identifying an associated pre-deleted file;
generating the after statistical snapshot from the substitute file; and
comparing the after statistical snapshot to any previously generated snapshot for the pre-deleted file.

16. The method of claim 1, wherein the predefined time period is one minute.

17. The method of claim 1, wherein the entity comprises at least one of a process, a group of processes, or at least one injected thread within a process.

18. The method of claim 1, wherein determining that the entity is exhibiting ransomware-like behavior is further based on at least one of a rarity of changed files, a total volume of space occupied by the changed files, or entropy changes across the changed file.

19. The method of claim 1, wherein analyzing the one or more file encryptions to detect ransomware comprises:
identifying an entity associated with at least one of the one or more file encryptions or the one or more file deletions;
determining that the entity accessed or attempted to access a list of languages on the endpoint device; and
in response to determining that the entity accessed or attempted to access the list of languages on the endpoint device, determining that the entity is exhibiting ransomware-like behavior.

20. The method of claim 1, wherein analyzing the one or more file encryptions to detect ransomware comprises:
identifying an entity associated with at least one of the one or more file encryptions or the one or more file deletions;
determining that a threshold number of files have been erased from the endpoint device; and
in response to determining that the threshold number of files have been erased from the endpoint device, determining that the entity is exhibiting ransomware-like behavior.

21. The method of claim 1, wherein analyzing the one or more file encryptions to detect ransomware comprises applying a machine learning algorithm trained on a set of ransomware samples to identify ransomware-like behavior.

22. The method of claim 1, wherein monitoring the file system of the endpoint device comprises determining a likelihood that a file will be a target of a ransomware attack.

23. The method of claim 22, wherein determining the likelihood is based on a prevalence of the file or a hash value of the file.

24. A method for detecting ransomware comprising:
monitoring a file system of an endpoint device;
detecting a plurality of file events from the file system;
generating a plurality of statistical snapshots, the plurality of statistical snapshots comprising two or more statistical snapshots for each of the files from each of the plurality of file events, wherein generating a statistical snapshot for each of the files comprises:
detecting an open event for the associated file;
determining to continue tracking events for the associated file based on one or more of an extension of the associated file and a location of the associated file;
monitoring the associated file for a pre-defined window of time after the open event;
detecting at least one additional event for the associated file in the pre-defined window; and
generating an after statistical snapshot for the associated file after detection of the at least one additional event;
analyzing the plurality of statistical snapshots to detect one or more file deletions within the plurality of file events; and
analyzing the one or more file deletions to detect ransomware, wherein analyzing the one or more file deletions to detect ransomware comprises:
identifying an entity associated with the one or more file deletions;
determining that a threshold number of files have been deleted from the endpoint device; and
in response to determining that the threshold number of files have been deleted from the endpoint device, determining that the entity is exhibiting ransomware-like behavior.

* * * * *